D. BRUCE.
Vacuum Pan.

No. 61,314.                        Patented Jan. 22, 1867.

Witnesses:                        Inventor:

United States Patent Office.

DUNCAN BRUCE, OF ROSSVILLE, NEW YORK.

Letters Patent No. 61,314, dated January 22, 1867; antedated January 17, 1867.

IMPROVED PROCESS OF MAKING SUGAR.

*The Schedule referred to in these Letters Patent and making part of the same.*

TO ALL WHOM IT MAY CONCERN:

Be it known that I, DUNCAN BRUCE, of Rossville, in the county of Richmond, and State of New York, have invented a new and improved Apparatus for Making Sugar; and I do hereby declare that the following is a full, clear, and exact description thereof, reference being had to the accompanying drawings, making a part of this specification, in which—

Similar letters of reference indicate corresponding parts in the two figures.

This invention relates to a new and improved apparatus for facilitating the evaporation of saccharine juice in the process of making sugar. The nature of my invention consists in the employment of a number of air-tight evaporating vessels having heaters suitably applied to them, and in combining therewith a condensing-chamber, and also a vacuum-chamber, between which communications are formed in such manner that during the treatment of the juice the air can be exhausted from its chambers, and its evaporation thereby greatly accelerated; at the same time provision is made for drawing the juice from one vessel into another by means of a vacuum created in the vacuum-chamber for the purpose of filtering and purifying this juice previously to boiling it, all as will be hereinafter set forth.

To enable others skilled in the art to understand my invention, I will describe its construction and operation.

Figure 1:
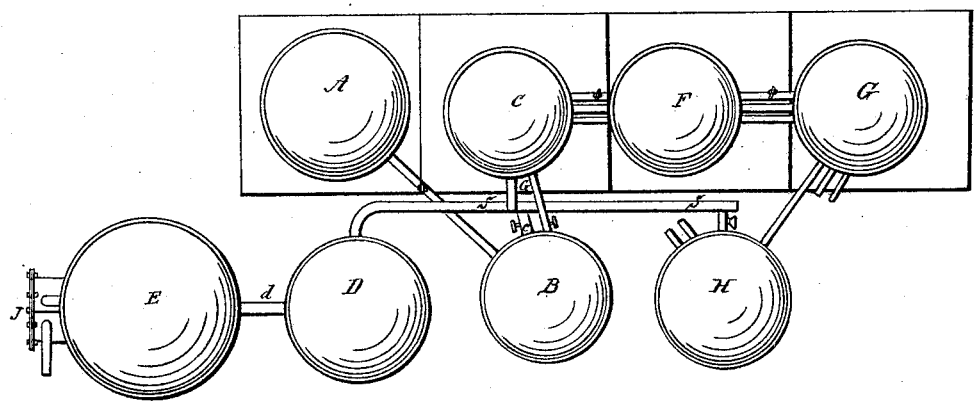
Figure 1 is a top view of the improved apparatus.
Figure 2:
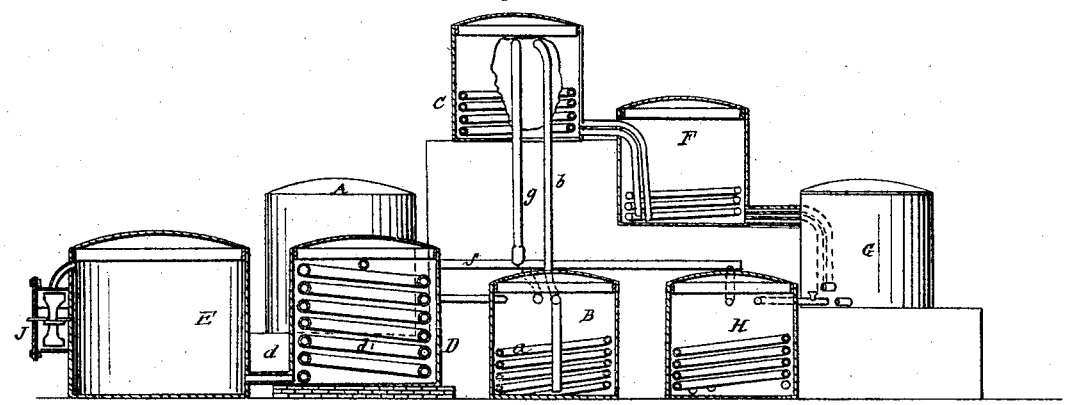
Figure 2 is a sectional elevation of the apparatus.

In the accompanying drawings, A is the reservoir for containing the juice in its crude state, from which reservoir the juice is drawn into the vacuum or evaporating vessel B; this vessel contains a worm or coil, $a$, through which steam is caused to circulate, and it communicates with the first filtering vessel $e$ by means of a pipe, $b$, which is furnished with a stop-cock that should be closed, except when the sirup is being transferred to the vessel C. This vacuum vessel B also communicates, by means of a pipe, $c$, with a pipe, $s$, leading to the condenser D. The cock in the short pipe of vessel B is opened only when air is to be drawn from this vessel, at which time the other cocks are closed. This condensing vessel D communicates with the vacuum-chamber E by means of a pipe, $d$, which is connected to the worm $d'$ in said vessel; this worm is connected at its upper end with the long pipe S leading into D. The vessel E has a suitable exhausting engine, J, applied to it. The vapor which is generated in the several evaporators is drawn rapidly off and into the worm $a'$ in D, where this vapor is quickly condensed by means of water which is caused to circulate freely in the condenser. The steam or hot-water worm $a$ in the evaporator B communicates with pipes leading to and from a steam boiler. The vessel C contains a steam worm heater, or a false bottom through which hot water or steam is caused to flow, and the sirup is elevated into this vessel from vessel B by means of a vacuum, the air being drawn off through a pipe, $g$, leading to the main pipe S, as shown in fig. 2, and also through the worm $a'$ in the condenser D. From the vessel C, the sirup is drawn into a filtering vessel, F, by means of a pipe which leads to the bottom of this vessel beneath a suitable filtering medium placed therein. In the vessel F there is a steam or hot-water heater communicating with a similar heater in the vessel C, and also with one in G, into which latter the sirup is drawn from F by its natural flow. In the vessel G the sirup flows above a filtering substance placed therein, and passes down through it as it is drawn off into the boiler H. This boiler H communicates with the condenser D, and also with the vacuum-chamber E by means of the pipe S, so that during the process of boiling in the vessel H a vacuum can be formed therein, and the vapor exhausted and condensed in D. The vessel H is provided with a steam worm which may communicate with the worms in the several chambers above described. The pipe $d$, which forms the communication between the vacuum-chamber E and the condenser D, should communicate with a vessel placed lower than the vessel D for receiving the condensed liquid, so that this liquid shall not be drawn into the vacuum-chamber.

The apparatus herein described may be employed upon a more extended scale for evaporating brine in the process of making salt.

Having thus described my invention, what I claim as new, and desire to secure by Letters Patent, is—

1. The combination of the vacuum-chamber, and condensing-chamber, with one or more evaporating-chambers having steam or hot-water heaters applied to them, substantially as described.

2. The combination of one or more filtering air-tight vessels, with one or more air-tight evaporators, and a condensing-chamber D, which communicates with a vacuum-chamber E, substantially as described.

DUNCAN BRUCE.

Witnesses:
R. T. CAMPBELL,
EDW. SCHAFER.